United States Patent [19]

Vial et al.

[11] Patent Number: 5,683,821

[45] Date of Patent: Nov. 4, 1997

[54] METAL WORKPIECE OBTAINED BY OXYGEN CUTTING

[75] Inventors: Dominique Vial, Lyons; Gérard Defay, Rives de Gier; Michel Blanchet, Saint Joseph, all of France

[73] Assignee: Creusot-Loire Industrie, Puteaux, France

[21] Appl. No.: 614,099

[22] Filed: Mar. 12, 1996

Related U.S. Application Data

[60] Continuation of Ser. No. 322,339, Oct. 13, 1994, abandoned, which is a division of Ser. No. 76,184, Jun. 14, 1993, Pat. No. 5,391,237.

[30] Foreign Application Priority Data

Jun. 12, 1992 [FR] France .................................. 92 07121

[51] Int. Cl.[6] ........................................................ B23K 7/00
[52] U.S. Cl. ............................ 428/599; 148/200; 148/205
[58] Field of Search ................................................ 148/902

[56] References Cited

U.S. PATENT DOCUMENTS

| 3,645,798 | 2/1972 | Birr et al. | 148/200 |
| 3,661,654 | 5/1972 | Lange | 148/200 |

FOREIGN PATENT DOCUMENTS

| 0138159 | 10/1979 | Germany | 148/200 |

*Primary Examiner*—Scott Kastler
*Attorney, Agent, or Firm*—Oblon, Spivak, McClelland, Maier & Neustadt, P.C.

[57] ABSTRACT

The workpiece is obtained by cutting a metal product by oxygen cutting. An oxygen cutting jet is sent onto a preheated cutting zone of the product. A peripheral sleeve of additional gas is formed around the oxygen cutting jet so as to send, into the cutting zone, a coaxial double jet constituted by the oxygen jet surrounded by the sleeve of gas at a pressure of less than 1 bar. The flow rate and the pressure of the cutting oxygen and of the additional gas are regulated separately. The invention also relates to an oxygen-cutting device for implementing the method and to the metal part obtained.

4 Claims, 3 Drawing Sheets

METAL WORKPIECE OBTAINED BY OXYGEN CUTTING

This application is a Continuation of application Ser. No. 08/322,339, filed on Oct. 13, 1994, now abandoned, which is a Division of application Ser. No. 08/076,184, filed on Jun. 14, 1993, now U.S. Pat. No. 5,391,237.

BACKGROUND OF THE INVENTION

1. Field of the Invention

The present invention relates to a method of manufacturing a metal workpiece, and especially a steel workpiece, by cutting a metal product, such as a plate or a block, by oxygen-cutting.

2. Discussion of the Background

In order to produce large boiler-construction components or heavy-mechanical components such as press platens or large magnets for a particle accelerator, blanks of workpieces whose shapes approach the final shapes desired are cut, by oxygen-cutting, from plates whose thickness ranges from 300 mm to 2 m. This cutting is performed by using an oxy-gas torch producing a heating flame obtained by combustion of a fuel gas in the oxygen, and a jet of gaseous or liquid oxygen, which cuts the metal and makes it burn. When the oxygen jet is gaseous, this jet is a "hard" jet, that is to say one obtained by a high-pressure supply.

This technique has a drawback resulting from this, namely that the quality of the cutting is poor and becomes increasingly poorer as the cut thickness increases. Among the defects which appear, there are especially:

a melting of the intersecting edge, on the same side as the torch, which creates a rounded edge whose radius is approximately 20 mm, for a thickness of 800 mm;

defects of verticality of the workpiece resting on one of its faces which are manifested by deviations from verticality of from 12 to 15 mm, which corresponds to the direction, perpendicular to the faces of the workpiece, in which the thickness is measured;

striations formed on the surface of the cut, whose depth reaches 5 mm; at the bottom of the cut, the striations are inclined and their depth may reach 8 mm;

hot-spots, corresponding to zones in which a local combustion excess, and therefore a hollowing at the surface of the cut, occurs;

the profile according to which the cutting is to be carried out is poorly followed; the tolerance is generally from 20 to 30 mm for a thickness of 800 mm.

These defects make it necessary to provide additional thicknesses of metal of from 40 to 50 mm over the entire profile and to remove these overthicknesses by machining with a machine tool, which is very costly given the size of the workpieces.

The cutting is not good and in particular it forms inclined striations because the oxygen jet lacks power beyond a certain cutting depth.

It has been proposed in German Patent Application DE-A-1,927,523 to surround the oxygen-cutting jet by a sleeve of additional gas; in German Patent Application DD-A-71271 and in European Patent Application EP-A-0,255,430 it is proposed to surround the oxygen-cutting jet by a sleeve of a mixture of oxygen and fuel gas, and in all cases to surround the whole assembly by a heating ring. However, these techniques, although enabling the productivity of the cutting to be increased, do not solve the problem of the cutting quality.

SUMMARY OF THE INVENTION

The object of the present invention is to provide a method of manufacturing a metal workpiece especially made of very thick steel by oxygen cutting a metal workpiece with a cutting quality such that it is no longer necessary to perform significant machining operations and that it is possible, for example, to be content to machine functional parts of the workpieces which are intended to interact with the functional parts of other workpieces.

For this purpose, the subject of the invention is a method of manufacturing a metal workpiece, and especially a steel workpiece, by cutting a metal product, such as a plate or a block, by oxygen cutting, in which, with the aid of a nozzle forming a heating ring, the metal product is preheated in a cutting zone corresponding to the edge of the component, an oxygen cutting jet is sent onto the preheated cutting zone and a peripheral sleeve of an additional low-pressure gas is formed around the oxygen cutting jet so as to send, into the cutting zone, a coaxial double jet constituted by the oxygen jet surrounded by the sleeve of additional gas. The supply pressure of the additional fuel gas is less than 1 bar and the flow rate and the pressure of the cutting oxygen on the one hand and of the additional gas on the other hand, are regulated separately.

Preferably, the oxygen cutting jet is a soft jet with a high flow rate and the cutting-oxygen supply pressure is less than 5 bar.

It is preferable that the nose of the nozzle is cooled and that the equivalent diameter of the sleeve of additional gas is less than or equal to twice the diameter of the cutting jet and in that the equivalent cross section of the sleeve of additional gas is from 0.75 to 2 times the cross section of the oxygen cutting jet.

Likewise it is preferable that the equivalent diameter of the heating ring lies between 3 and 4 times the diameter of the oxygen cutting jet and that the equivalent cross section of the heating ring lies between 1 and 2 times the cross section of the oxygen cutting jet.

The subject of the invention is also an oxygen-cutting device for implementing the method according to the invention, comprising a nozzle having a central channel for inflow of a stream of oxygen, annularly arranged means for inflow of additional gas surrounding the central channel and means for inflow of a mixture of oxygen and fuel gas surrounding the annularly arranged means for inflow of additional gas.

The means for inflow of additional gas are arranged circularly on a circle of diameter less than or equal to twice the diameter of a the central channel and the total cross section of the means for inflow of additional gas lies between 0.75 and 2 times the cross section of the central channel.

Preferably, the means for inflow of a mixture of oxygen and fuel gas are arranged on a circle of a diameter lying between 3 and 4 times the diameter of the central channel and the total cross section of the means for inflow of a mixture of oxygen and fuel gas lies between 1 and 2 times the cross section of the cutting channel.

The annularly arranged means for inflow of additional gas may be a plurality of channels surrounding the central channel and they may also include an annular groove. The means for inflow of a mixture of oxygen and fuel gas may be constituted by a plurality of channels.

The subject of the invention is also an oxygen-cutting device for implementing the method according to the invention, including a nozzle having a body of a generally cylindrical shape, which body is pierced with gas-passage channels, and having a gas-outlet face and an inlet end constituted by a cone-shaped connection surface coaxial with the cylindrical body and gas-supply means including a distributor having a cone-shaped surface intended to interact with the connection surface of the nozzle in order to constitute chambers for supplying gas to the channels of the nozzle, and pipes for supplying the chambers, the nozzle including:

a central channel arranged on the axis of the cylindrical body emerging, at one of its ends, on the outlet face of the nozzle and, at its other end, on the connection surface in the region of a central chamber of the distributor, a first plurality of channels parallel to the axis of the nozzle and arranged on the periphery of the nozzle emerging, on the outlet face of the nozzle, into an annular zone having for axis the axis of the nozzle via a first outlet end and having a second end emerging at the connection surface into a first annular chamber of the distributor, this chamber being delimited on the connection surface by a first annular groove coaxial with the nozzle;

a plurality of channels which are inclined in relation to the axis of the nozzle and are equal in number to the channels of the first plurality of channels, and which are arranged towards the outside of the nozzle in relation to the channels of the first plurality of channels, each emerging into a channel of the first plurality of channels via a first end and on the connection surface via a second end, inside a second chamber delimited on the connection surface by a second annular groove coaxial with the nozzle, characterized in that the nozzle furthermore includes:

a second plurality of channels parallel to the axis of the nozzle emerging, at one of their ends, on the outlet face of the nozzle, into an annular zone having for axis the axis of the nozzle and located between the outlet end of the central channel and the annular zone into which the outlet ends of the channels of the first plurality emerge and, at their other ends, in a chamber of the distributor, this chamber being delimited on the connection surface of the nozzle by a third annular groove coaxial with the nozzle.

The end of the cylindrical body of the nozzle may include an annular groove emerging on its outlet face having for axis the axis of the nozzle, into which the outlet ends of the channels of the second plurality of channels emerge.

Preferably, the wall of the central channel is polished so as to have a "glazed" appearance.

The nozzle may furthermore include, around its outlet end, an annular chamber having a radial partition wall, and cooling-water supply means and cooling-water drainage means each communicating with the inner space of the annular chamber on either side of the partition wall.

Finally, the invention relates to a metal workpiece and especially a steel workpiece having two substantially parallel opposite faces and a thickness which is greater than 0.100 m and may range up to 2 meters, characterized in that:

it is obtained with its final dimensions by oxygen cutting a metal product without machining by removal of chips in its non-functional zones, and it has in the rough cutting state:

a radius R, characteristic of the intersecting-edge melting of the workpiece, of less than 8/1000 of the thickness of the workpiece, a deviation from verticality V of less than 8/1000 of the thickness of the workpiece, vertical cutting striations which are uniform and have a depth of less than 1/1000 of the thickness of the workpiece, a mean rugosity of less than 20 µm+20 µm×e, e being the thickness of the workpiece expressed in meters, and the vertical direction corresponding to the direction, perpendicular to the opposite faces of the workpiece, in which the thickness is measured.

The method according to the invention makes it possible to produce workpieces cut directly to the final dimensions and requiring machining only for the functional parts.

BRIEF DESCRIPTION OF THE DRAWINGS

The invention will now be described in greater detail with regard to the attached figures in which.

DESCRIPTION OF THE PREFERRED EMBODIMENTS

Figure 1:
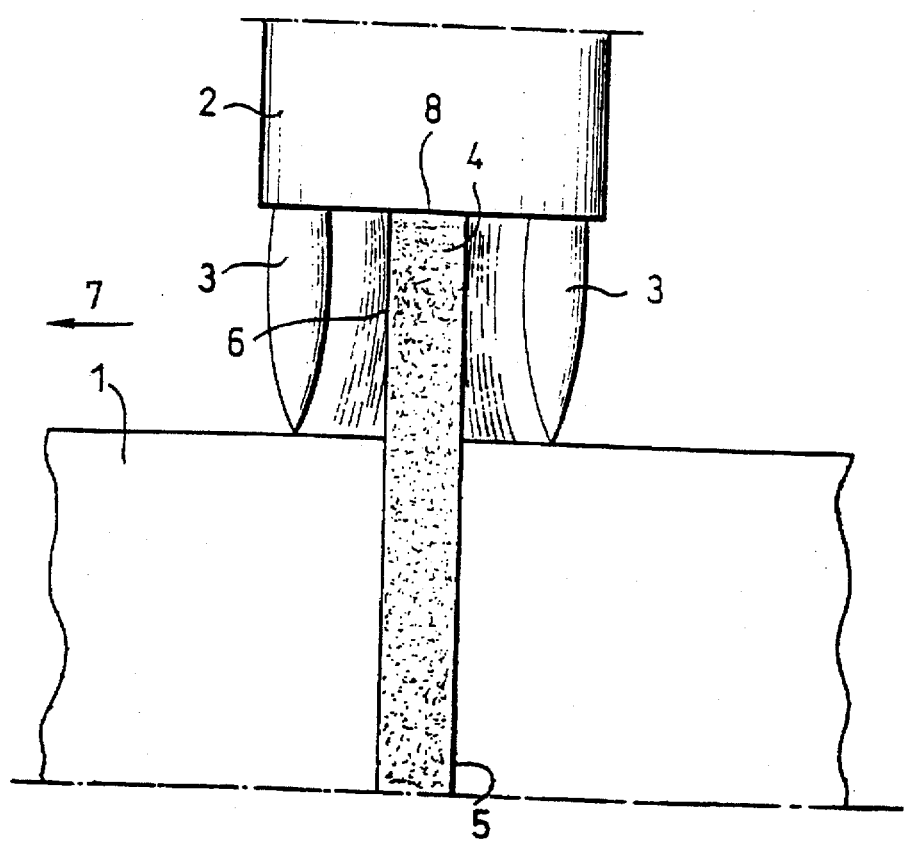
FIG. 1 is a skeleton diagram showing in vertical cross section an operation of cutting a workpiece by oxygen cutting using the method according to the invention.

In order to cut a thick workpiece from a metal product 1 such as a plate or a block with a nozzle 2 of a torch, hot flames 3 are created resulting from the combustion in oxygen of a fuel gas, such as a town gas, propane, butane or acetylene. These flames are arranged circularly so as to form a heating ring (only two flames may be seen in the figure) and heat up the workpiece locally. A jet 4 of pure oxygen surrounded by a sleeve 6 of additional fuel gas, which can be town gas, methane, propane, acetylene, etc., is sent via the central part of the torch. The whole assembly is moved in the direction of the arrow 7. The additional gas is sent at a low pressure, of less than 1 bar in relation to atmospheric pressure; the oxygen jet 4 is what the person skilled in the art calls a soft jet, obtained, for example, with an oxygen supply pressure of less than 5 bar and a diameter of the oxygen supply hole 8 of the order of 10 mm.

The oxygen and additional gas supplies are regulated separately in terms of flow rate and pressure by means known to the person skilled in the art.

Close to the outlet of the nozzle 2, the sleeve 6 of additional gas may be considered as a hollow cylinder of internal diameter $d_1$, of external diameter $d_2$ and of cross section $$\frac{\pi}{4}(d_2^2 - d_1^2),$$

and that S is called the equivalent cross section of the sleeve 6 and that $$\frac{d_1 + d_2}{2}$$

is the equivalent diameter of the sleeve 6.

Likewise, the hot flames 3 are arranged in a ring and may be considered as enveloped by a hollow cylinder of internal diameter $D_1$ and of external diameter $D_2$ and of cross section $$\frac{\pi}{4}\left(D_2^2 - D_1^2\right)$$

and that S is the equivalent cross section of the ring of flames and $$\frac{D_1 + D_2}{2}$$

is the equivalent diameter of this ring.

Results are obtained which are so much the better when the equivalent cross section s of the sleeve of additional gas lies between 0.75 and 2 times the cross section of the oxygen cutting jet and the equivalent diameter $$\frac{d_1 + d_2}{2}$$

of the sleeve is less than or equal to 2 times the diameter of the oxygen cutting jet.

In addition, it is preferable for the equivalent cross section S of the ring of flame to lie between 1 and 2 times the cross section of the oxygen cutting jet and the equivalent diameter to lie between 3 and 4 times the diameter of the oxygen cutting jets.

As in the known oxygen-cutting methods, the flames 3 locally heat the metal which burns in contact with the oxygen jet 4, this creating a kerf 5 in the workpiece and establishes the cut.

It has been found, unexpectedly, that by using a double jet which includes an oxygen jet surrounded by a sleeve of gas, especially a fuel gas, and a soft oxygen jet instead of a hard jet, a remarkable cutting quality was obtained which characterizes the workpieces thus obtained.

When the gas constituting the sleeve of gas is not a fuel gas, the gas may be argon or nitrogen. However, it has been found that, by using a fuel gas, better results were obtained than with a non-fuel gas.

Finally, in order to stabilize the method, it is necessary to cool the nose of the nozzle 2.

Figure 6:
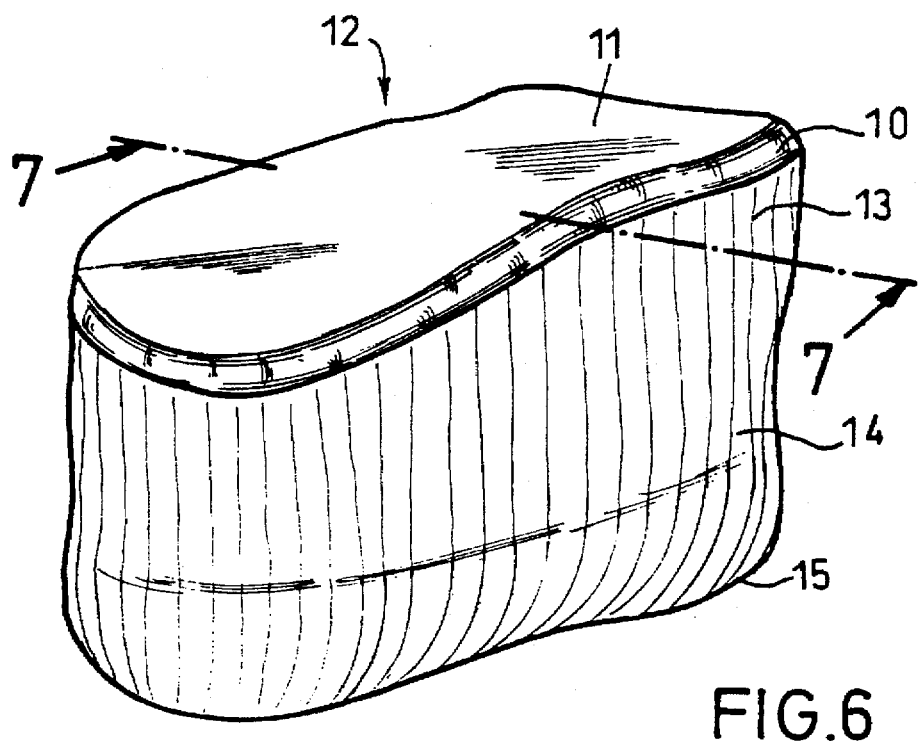
FIG. 6 is a diagrammatic representation in perspective of the cutting defects of a thick oxygen-cut workpiece.
Figure 7:
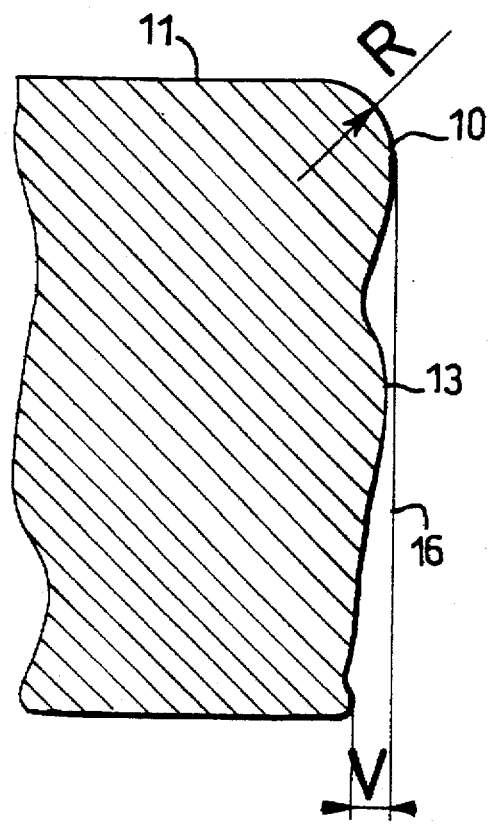
FIG. 7 is a view in vertical cross section of the cutting defects of a thick oxygen-cut workpiece.

The cutting defects that are encountered are (FIGS. 6 and 7):

intersecting-edge melting: the intersecting edge 10, forming the intersection of the upper face 11 of the workpiece 12, located on the same side as the cutting torch, and of the cut sidewall 13, melts partially and, seen in cross section, has a rounded edge of radius R; the smaller R the better the cut;

vertical striations 14 and inclined striations 15: these are irregularities of the cut surface which includes furrows characterized by their depth; in the prior art, it is found that, when the cut thickness becomes significant, there are vertical striations over two thirds of the height from the upper face and inclined, deeper striations over the remaining third of the height;

verticality: in relation to a surface perpendicular to the upper face 11, the surface 13 of the cut recedes over the entire height by a distance V shown in FIG. 7 in which the trace of the surface perpendicular to the upper face 11 is the straight line 16;

rugosity, measured by the arithmetic-mean rugosity Ra according to French Standard NFE 05-915/05-018;

hot-spots, which are localized zones where an excess of metal combustion takes place and which are manifested by a removal from the surface of the cut.

All these defects, except for the hot-spots, have an intensity which is generally proportional to the cut thickness; the striations are twice as deep for a workpiece with a thickness of one meter than for a workpiece with a thickness of 500 mm.

By way of example, for a workpiece with a cut thickness of 800 mm, with the method according to the invention or with a method according to the prior art, the following defect amplitudes are obtained:

|  | According to the invention | Prior Art |
| --- | --- | --- |
| Intersecting-edge melting R | <4 mm | 20 mm |
| Vertical striations (depth) | <1 mm | 5 mm |
| Inclined striations | None | 8 mm |
| Verticality | <5 mm | 15 mm |
| Rugosity, Ra | 20 μm | outside the normal measurement range (>150/200 μm) |
| Hot-spots | None | at least one per face |

More generally, with the method according to the invention, if e represents the thickness of the workpiece expressed in meters, then:

| intersecting-edge melting | $R \leq 8 \times \frac{e}{1000}$ |
| --- | --- |
| vertical striations depth | $\leq 1 \times \frac{e}{1000}$ |
| verticality | $\leq 8 \times \frac{e}{1000}$ |
| rugosity | $Ra \leq 20\ \mu m + 20\ um \cdot \frac{e}{1\ m}$ |

(for e = 1 m, R = 6 mm and Ra = 20 μm).

The defect amplitudes are sufficiently low for the non-functional parts of the workpieces, that is those not interacting with other workpieces, to remain rough cut by the oxygen cutting.

Figure 2:
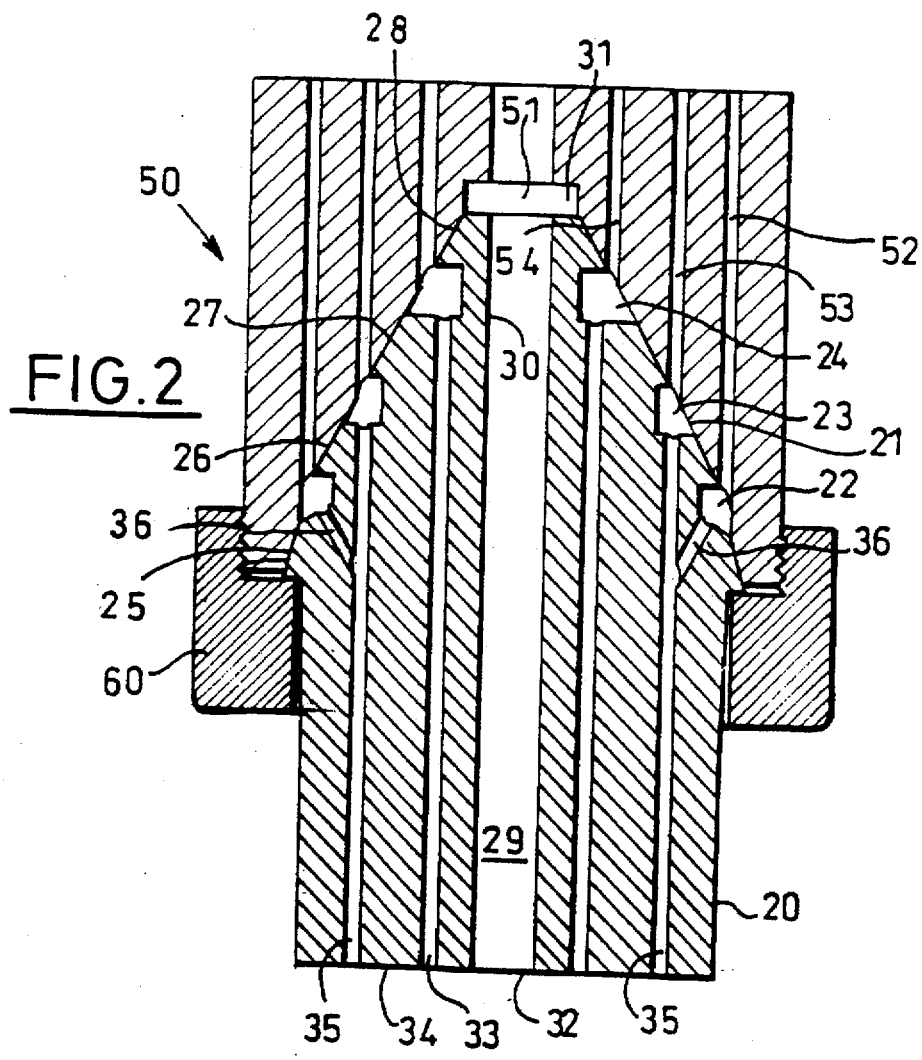
FIG. 2 is a partial view in axial cross section of an oxygen-cutting device used in the method according to the invention to be implemented.
Figure 3:
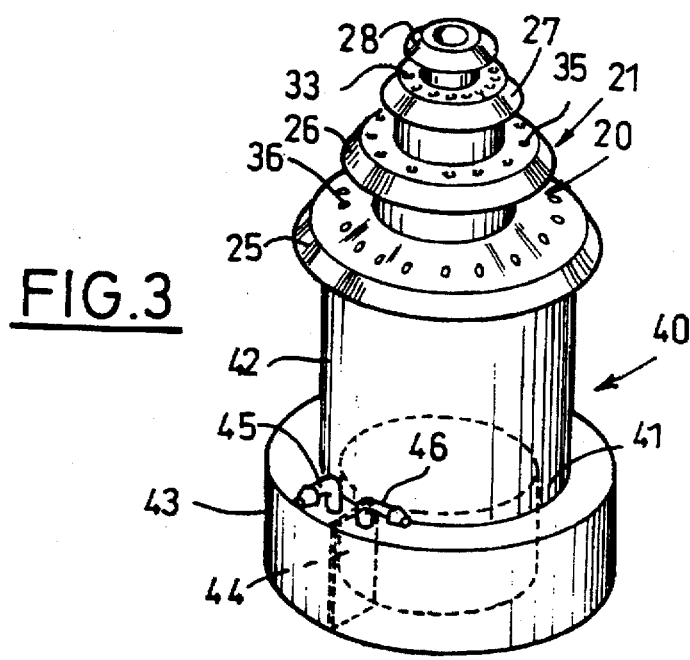
FIG. 3 is a perspective view of an oxygen-cutting nozzle for implementing the invention, equipped with a device for cooling its end.

In order to implement this method, a torch is used equipped with a nozzle (FIG. 2) which includes a cylindrical body 20 extended by a conical connection part 21 provided with three circular grooves 22, 23, 24 which separate four frustoconical annular surfaces 25, 26, 27, 28. The nozzle is pierced along its axis with an axial channel 29 whose wall 30 is glazed. This axial channel 29 is supplied with cutting oxygen via its end 31 located on the same side as the conical part 21 and the cutting oxygen forms a jet at the outlet 32 of the axial channel 29 on the outlet face 34 of the nozzle.

A distributor body 50, including a conical connection surface which comes to be applied against the conical connection part 21 of the nozzle and is fixed to the nozzle by a nut 60, has annular grooves in positions corresponding to the positions of the grooves 22, 23, 24 in the nozzle and in the frustoconical annular connection surfaces in positions corresponding to the surfaces 25, 26, 27 and 28 of the nozzle. The distributor 50 thus delimits, with the part 21 of the nozzle, distribution chambers in the region of each of the grooves, 22, 23 and 24. A chamber 51, enabling the central channel 29 to be supplied with cutting oxygen, is also provided at the central part of the device. The distribution chambers are supplied with gas via conduits, such as conduits 52, 53 and 54, which are themselves connected to pipes for supplying the oxygen-cutting torch.

A first plurality of longitudinal channels 35 parallel to the axial channel 29 are arranged circularly on the periphery of the body 20 of the nozzle and emerge, on the one hand, on the outlet face 34 of the nozzle, into an annular zone having for axis the axis of the nozzle and, on the other hand, into a first distribution chamber located in the region of the groove 23.

A plurality of channels 36, which are inclined in relation to the axis of the nozzle and equal in number to the channels 35, bring each channel 35 into communication with the second distribution chamber located in the region of the groove 22.

The channels 35 are supplied with oxygen via the groove 23. The channels 35 are supplied with fuel gas via the groove 22 and the channels 36. The oxygen and the fuel gas are mixed in the channel 35 and, at the outlet of the latter, form a flame.

Figure 4:
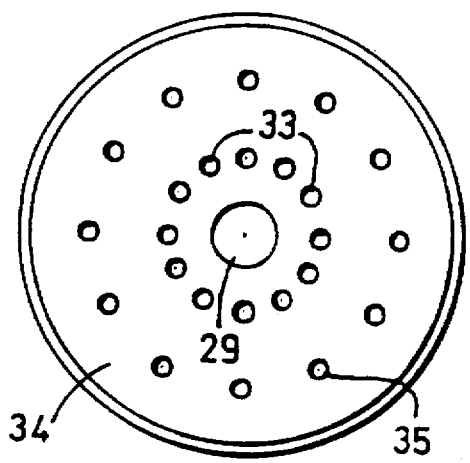
FIG. 4 is a front view of the end of an oxygen-cutting nozzle for implementing the invention.

According to the invention, a second plurality of longitudinal channels 33 parallel to the central channel 29 are arranged around the channel 29 and emerge, on the one hand, on the outlet face 34 of the nozzle, into an annular zone, the axis of which is coincident with the axis of the nozzle and is located around the outlet end of the central channel 29 and inside the annular zone into which the channels 35 emerge (see FIG. 4) and, on the other hand, into a third distribution chamber, in the region of the groove 24.

The channels 33 are supplied with low-pressure fuel gas via the conduits 54 of the distributor so as to form a sleeve of fuel gas surrounding the oxygen jet at the outlet of the nozzle.

Figure 5:
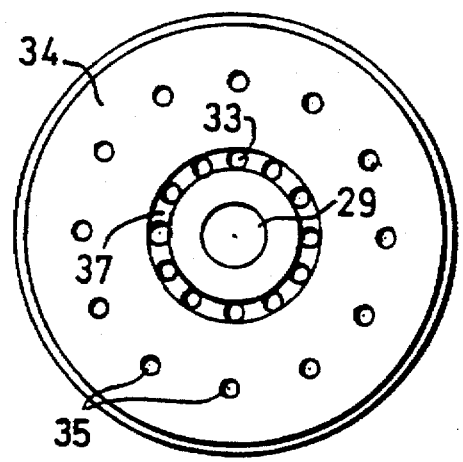
FIG. 5 is a front view of the end of a second embodiment of an oxygen-cutting nozzle for implementing the invention.

As shown in FIG. 5, the second plurality of channels 33 may emerge into a circular groove 37 made in the end 34 of the nozzle and surrounding the outlet of the axial channel 29.

In order to satisfy the geometrical conditions imposed on the sleeve of additional gas and on the ring of flames, the channels 33 are arranged in a circle passing through their axes, the diameter of which is less than or equal to twice the diameter of the channel 29 and the sum of the cross sections of the channels 33 lies between 0.75 and 2 times the cross section of the channel 29.

Likewise, the channels 35 are arranged in a circle passing through their axes, of diameter lying between 3 and 4 times the diameter of the channel 29 and the sum of the cross sections of the channels 35 lies between 1 and 2 times the cross section of the channel 29.

In order to obtain a good cutting quality over a long time, it is necessary to cool the end of the cylindrical part of the nozzle. For this, an annular chamber, through which cooling water travels, may be placed around this end.

In a particular embodiment, the nozzle 40 carries, at the outlet end 41 of its cylindrical part 42, an annular chamber 43 which includes a radial wall 44. The chamber 43 is connected on either side of the radial wall 44 to a water supply 45 and to a water-drainage means 46. This chamber is made as one piece with the nozzle and is closed by a cover which cannot be seen in the drawing. This chamber may also be separated from the nozzle and therefore able to be dismantled.

It will be noted that the method may be used to cut workpieces with a thickness of less than 300 mm, for example a thickness lying between 100 mm and 300 mm and especially workpieces covered with a thick layer of scale, without it being necessary to remove this scale beforehand.

It will also be noted that the cylindrical body 20 of the nozzle may have any cross section and not simply a circular one. The cross section may in fact include lobes or be substantially square. Generally, the cylindrical body is a body generated by a straight line moving parallel to itself and bearing one a closed curve. Obviously, numerous modifications and variations of the present invention are possible in light of the above teachings. It is therefore to be understood that within the scope of the appended claims, the invention may be practiced otherwise than as specifically described herein.

We claim:

1. A steel workpiece having two substantially parallel opposite faces and a thickness which is from 0.100 to 2 meters, which comprises:
   a workpiece having final dimensions obtained solely by oxygen cutting a metal product without machining by removal of chips, wherein the metal product has rough cut surfaces in a rough cut state:
   a radius R for the intersecting-edge melting portion of the workpiece of less than 5/1000 of the thickness of the workpiece,
   a deviation from vertical of less than 8/1000 of the thickness of the workpiece,
   a plurality of vertical cutting striations which are substantially uniform and have a depth of less than 1/1000 of the thickness of the workpiece, and
   a mean rugosity of less than $$20\,\mu m + 20\,\mu m \times \frac{e}{1m}$$

wherein e is the thickness of the workpiece expressed in meters, and a direction, perpendicular to opposite faces of the workpiece, in which the thickness is measured comprises a vertical direction.

2. Workpiece according to claim 1, wherein the thickness is greater than 0.300 m.

3. A product made by a process of manufacturing a metal workpiece by cutting a metal product solely by oxygen cutting and without machining, said metal product having a thickness of 0.300 to 2 meters, which comprises:
   preheating the metal product in a cutting zone corresponding to an edge of the workpiece, with the aid of a nozzle forming a heating ring,
   sending an oxygen cutting jet onto the preheated cutting zone and forming a peripheral sleeve of an additional low-pressure gas around the oxygen cutting jet so as to send, into the cutting zone, a coaxial double jet constituted by the oxygen jet surrounded by a sleeve of additional gas,
   forming the peripheral sleeve from an additional gas selected from the group consisting of fuel gas, argon and nitrogen having an overpressure in relation to atmospheric pressure of less than 1 bar, and
   separately regulating the flowrate and the pressure of the cutting oxygen on the one had and the flowrate and the pressure of the additional gas on the other hand.

4. A product made by a process of manufacturing a metal workpiece by cutting a metal product solely by oxygen cutting and without machining, which comprises:
   preheating the metal product in a cutting zone corresponding to an edge of the workpiece, with the aid of a nozzle forming a heating ring,
   sending an oxygen cutting jet onto the preheated cutting zone and forming a peripheral sleeve of an additional gas selected from the group consisting of fuel gas, argon and nitrogen having an overpressure in relation to atmospheric pressure of less than 1 bar, separately regulating the flow rates and pressures of the cutting oxygen and of the additional gas wherein the equivalent diameter of said sleeve of additional gas is selected to at most be equal to twice the diameter of said oxygen cutting jet and an equivalent cross-section of said sleeve of additional gas is selected so as to be from 0.75 to 2 times the cross-section of the oxygen cutting jet, and selecting an equivalent diameter of said heating ring so as to be between 3 and 4 times the diameter of the oxygen cutting jet and selecting an equivalent cross-section of the heating ring so as to be between 1 and 2 times the cross-section of the oxygen cutting jet.

* * * * *